US012766879B2

(12) United States Patent
Kern et al.

(10) Patent No.: US 12,766,879 B2
(45) Date of Patent: Oct. 20, 2026

(54) SOUND ATTENUATION DEVICE FOR VEHICLE WHEELS

(71) Applicant: Siemens Mobility Austria GmbH, Vienna (AT)

(72) Inventors: Thomas Kern, Gralla (AT); Gerald Schleinzer, Graz (AT)

(73) Assignee: Siemens Mobility Austria GmbH, Vienna (AT)

( * ) Notice: Subject to any disclaimer, the term of this patent is extended or adjusted under 35 U.S.C. 154(b) by 830 days.

(21) Appl. No.: 17/915,846

(22) PCT Filed: Mar. 26, 2021

(86) PCT No.: PCT/EP2021/057899
§ 371 (c)(1),
(2) Date: Sep. 29, 2022

(87) PCT Pub. No.: WO2021/198062
PCT Pub. Date: Oct. 7, 2021

(65) Prior Publication Data

US 2023/0150301 A1 May 18, 2023

(30) Foreign Application Priority Data

Apr. 2, 2020 (AT) .................................. 50279/2020

(51) Int. Cl.
*B60B 17/00* (2006.01)

(52) U.S. Cl.
CPC ...... *B60B 17/0024* (2013.01); *B60B 2360/50* (2013.01)

(58) Field of Classification Search
CPC .............. B60B 17/002; B60B 17/0024; B60B 17/0017
See application file for complete search history.

(56) References Cited

U.S. PATENT DOCUMENTS 3,377,097 A * 4/1968 Swanson ................ F16H 55/14 295/6
4,183,572 A * 1/1980 Albrecht ............ B60B 17/0017 295/20

(Continued)

FOREIGN PATENT DOCUMENTS

CN 1123378 5/1996
CN 201494248 6/2010

(Continued)

OTHER PUBLICATIONS

Machine translation of DE 3316759. (Year: 1984).*

(Continued)

*Primary Examiner* — Jason R Bellinger
(74) *Attorney, Agent, or Firm* — Cozen O'Connor

(57) ABSTRACT

A sound attenuation device for vehicle wheels, in particular for wheels of rail vehicles, includes a ring assembly having at least one open first ring and one open second ring, between which a viscoelastic first layer or an open elastic ring is arranged, wherein at least the first ring is clampable in a recess in a wheel body of a wheel having the wheel body, wherein in order to create advantageous construction conditions, a closure piece is connected to the ring assembly, where the closure piece is arranged in an opening between a first end of the ring assembly and a second end of the ring assembly, such that the ring assembly is secured mechanically.

15 Claims, 4 Drawing Sheets

(56) References Cited

U.S. PATENT DOCUMENTS

| | | | | | |
|---|---|---|---|---|---|
| 4,364,594 | A * | 12/1982 | Raquet | B60B 17/0017 295/31.1 |
| 4,496,183 | A * | 1/1985 | Kasper | B60B 17/0017 295/1 |
| 5,386,894 | A | 2/1995 | Barca | |
| 9,770,942 | B2 | 9/2017 | Fujimoto et al. | |
| 10,933,688 | B2 | 3/2021 | Guerder et al. | |
| 2016/0023510 | A1 | 1/2016 | Fujimoto et al. | |
| 2019/0084347 | A1 | 3/2019 | Guerder et al. | |

FOREIGN PATENT DOCUMENTS

| | | | |
|---|---|---|---|
| CN | 104723790 | | 6/2015 |
| CN | 106004228 | | 10/2016 |
| CN | 205970619 | | 2/2017 |
| CN | 109249750 | | 1/2019 |
| CN | 209096377 | U | 7/2019 |
| CN | 110641226 | | 1/2020 |
| DE | 3316759 | | 10/1984 |
| DE | 69105379 | | 5/1995 |
| EP | 0466540 | | 1/1992 |
| EP | 0466540 | B1 | 11/1994 |
| EP | 2118516 | | 11/2009 |
| EP | 2230096 | | 9/2010 |
| EP | 2554399 | | 2/2013 |
| EP | 2230096 | B1 | 4/2013 |
| EP | 2979896 | | 2/2016 |
| EP | 2979896 | B1 | 3/2018 |
| EP | 3459760 | | 3/2019 |
| JP | 3991317 | | 3/2003 |
| WO | 2014131676 | | 9/2014 |

OTHER PUBLICATIONS

Wikipedia, "Article Wikipedia Verbindungstechnk" Feb. 8, 2019.

PCT International Search Report dated Jul. 12, 2021 based on PCT/EP2021/057899 filed Mar. 26, 2021.

* cited by examiner

SOUND ATTENUATION DEVICE FOR VEHICLE WHEELS

CROSS-REFERENCE TO RELATED APPLICATIONS

This is a U.S. national stage of application No. PCT/EP2021/057899 filed 26 Mar. 2021. Priority is claimed on Austrian Application No. A50279/2020 filed 2 Apr. 2020, the content of which is incorporated herein by reference in its entirety.

BACKGROUND OF THE INVENTION

1. Field of the Invention

The invention relates to a sound attenuation device for vehicle wheels, especially for wheels of rail vehicles, comprising a ring assembly with at least one open first ring and an open second ring, between which a viscoelastic first layer or an open elastic ring is arranged, where at least the first ring can be clamped in a recess in a wheel body of the wheel having the wheel body.

2. Description of the Related Art

In a design of wheels of vehicles, for example, the design of rail vehicles, noise limit values defined by authorities or customers (e.g., relating to noise from vehicles passing by) must be taken into consideration. At high speeds, in particular, high noise emissions frequently occur, which are often attenuated by sound absorbers. Furthermore, an effective sound attenuation in heavily built-up areas (e.g., for urban transport vehicles, such as streetcars) is important.

WO 2014/131676 A1 discloses a conventional sound-attenuated wheel of a rail vehicle. Attenuation assemblies with a multiplicity of oscillating weights of different thicknesses are provided on a rim of the wheel facing towards a wheel center. These attenuation assemblies are connected to the wheel via viscoelastic layers. Arranged between the oscillating weights are further viscoelastic layers of different thicknesses.

EP 0 466 540 A1 shows an annular oscillation damper, in which open rings have one or more viscoelastic layers arranged between them and which is provided on an end face side of a gear wheel in a recess of the gear wheel. It is not evident in EP 0 466 540 A1, however, to what extent the oscillation damper is secured by a closure.

SUMMARY OF THE INVENTION

It is an object of the invention to provide a sound attenuation device secured mechanically, which is further improved in comparison to the conventional attenuation devices, is constructively in a simple manner and is also suitable for high vehicle speeds and wheels with shoe brakes.

This and other objects and advantages are achieved in accordance with the invention by a sound attenuation device, in which a closure piece is connected to a ring assembly, where the closure piece is arranged in an opening between a first end of the ring assembly and a second end of the ring assembly. This protects the ring assembly from falling down out of its carrier (e.g., from the wheel). It is thereby secured redundantly against being lost, because the first ring is additionally also pre-tensioned in the recess of the wheel or is clamped to the wheel. Relative movements of the first and second ends of the ring assembly towards one another and away from one another are limited to a negligible or necessary degree because of the closure piece. An accidental slipping out of the ring assembly from the recess is avoided by this.

The inventive sound attenuation device can therefore be used even in vehicles that travel at high speed (e.g., in rail vehicles traveling at speeds of more than 300 km/h) and also in environments with heavy vibrations, shocks etc. It should be understood it is also possible to use the inventive sound attenuation device for vehicles in urban transport (e.g., for streetcars). The loss-prevention element is not constructively complex, even installation and removal of the closure piece and the ring assembly are simple and take little time.

It is useful for there to be a gap formed between the closure piece and the ring assembly in the area of the first end and the second end. This compensates for tolerances and makes it easier to install the closure piece.

An especially simple and robust embodiment is obtained when the ring assembly, at least in the area of the first end, has at least one first hole, into which a locating pin of the closure piece or a locating part connected to the closure piece is introduced.

In this connection, it is also helpful for the ring assembly to have at least a second hole in the area of the second end. What is achieved by this is a flexibility in relation to an orientation of the closure piece in the inventive sound attenuation device. The locating pin or the locating part can be inserted into the first hole in the area of the first end of the ring assembly but, as an alternative, the locating pin can also be inserted into the second hole in the area of the second end of the ring assembly.

An alternative solution for connecting the closure piece to the ring assembly is obtained if the ring assembly has at least one locating pin at least in the area of the first end or at least one locating part is connected to the ring assembly, which is inserted into a hole in the closure piece.

Furthermore, it is useful for the ring assembly to be screwed to the closure assembly. This measure makes for an especially secure connection between the closure piece and the ring assembly. If the closure piece is coupled via the locating pin or the locating part to the ring assembly and is additionally screwed to the ring assembly, then a redundant connection between the closure piece and the ring assembly is achieved.

An advantageous solution is achieved when the ring assembly is formed and arranged overlapping with the closure piece. In this connection, it is helpful for the at least first ring to be arranged together with the closure piece in the area of the opening forming a set-back portion.

An installation area on the ring assembly (e.g., with the first hole or the locating pin or the locating part) for connecting the closure piece and the ring assembly is provided by these measures.

For an insertion process of the ring assembly into its carrier, it is advantageous for the at least first ring to have a greater outer diameter than the second ring.

An especially secure connection of the ring assembly with its carrier is obtained when the at least first ring is able to be clamped with the wheel body into a groove of the wheel body, which is provided on a side of a wheel rim that faces away from the running surface of the wheel. An especially effective sound deadening is moreover achieved by this measure, because the ring assembly is arranged close to the running surface of the wheel, i.e., in an area with high sound emission.

It is furthermore helpful for the closure piece to be configured and arranged such that an overall imbalance of the wheel with the sound attenuation device is equal to or less than an overall imbalance limit value of the wheel. This measure avoids the wheel having an impermissibly large imbalance because of the inventive sound attenuation device.

For installation of the sound attenuation device on a wheel, it is useful if, in a first installation step, the ring assembly is introduced pre-tensioned into a recess of the wheel body, in a second installation step the closure piece is introduced into the opening and in a third installation step the closure piece is connected to the ring assembly.

This makes for a fast and secure connection of the inventive sound attenuation device to the wheel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in greater detail below with the aid of exemplary embodiments, in which.

DETAILED DESCRIPTION OF THE EXEMPLARY EMBODIMENTS

Figure 1:
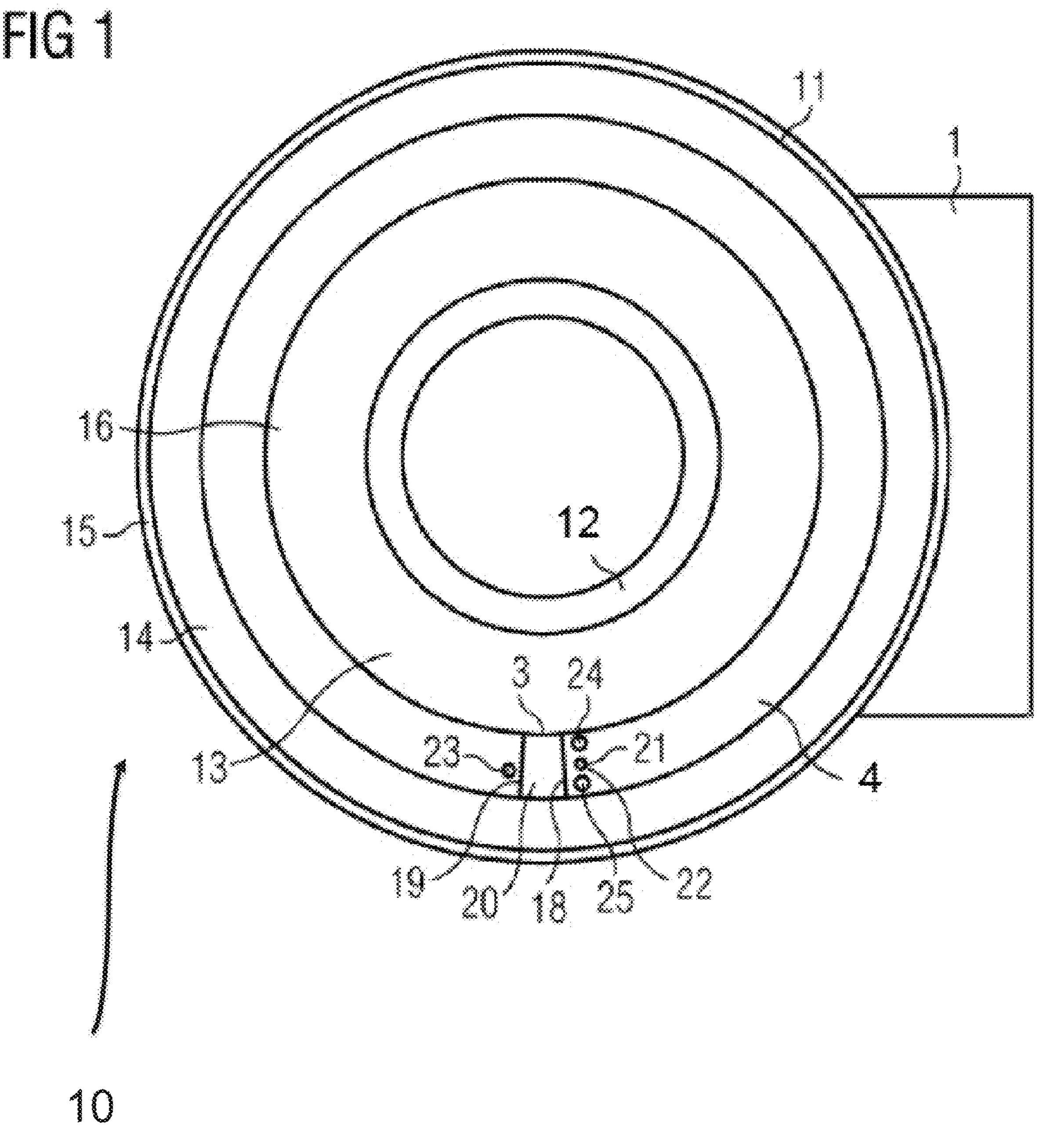
FIG. 1 shows a general layout of an exemplary first embodiment of an inventive sound attenuation device connected to a wheel with a ring assembly and a closure piece.

FIG. 1 shows a general layout of an exemplary first embodiment of an inventive sound attenuation device connected to a wheel of a bogie of a rail vehicle, which has a shoe brake 1.

In accordance with the invention, it is also conceivable, however, for the bogie not to have a brake or to have another brake. If, for example, the bogie has a disk brake then the inventive sound attenuation device can be arranged inside or outside a friction ring of the disk brake on the wheel.

The sound attenuation device has a ring assembly 2 and a closure piece 3. The ring assembly 2 has an open first ring 4, an open second ring 5 and an open third ring 6, which are connected to each other via a viscoelastic first layer 7 and a viscoelastic second layer 8 using vulcanization.

The second ring 5, the third ring 6 and also the first layer 7 and the second layer 8 are not visible in FIG. 1.

The first ring 4 is inserted into a recess of a wheel body 10 of the wheel formed as a groove 9 under its own tension and is clamped in the groove 9 to the wheel body 10.

The wheel comprises the wheel body 10 as well as a running surface 11, which is in contact with a rail of a track (not shown in FIG. 1). The wheel body 10 has a wheel hub 12, a wheel web 13 and also a wheel rim 14 with a flange 15.

The groove 9 is formed running around in the wheel rim 14 on a side facing away from or opposite to the running surface 11, whereby the ring assembly 2 extends in the direction of the wheel hub 12 or in the direction of a center of the wheel. The first ring 4 is arranged facing towards an outer side of the wheel 16, the third ring 6 facing towards an inner side of the wheel 17 and the wheel web 13 visible in conjunction with an exemplary second inventive embodiment of an inventive sound attenuation device in FIG. 2 and FIG. 3. The second ring 5 is arranged between the first ring 4 and the third ring 6.

Sufficient free space for connecting the closure piece 3 to the ring assembly 2 is provided between the third ring 6 and the wheel web 13.

As mentioned, the first ring 4, the second ring 5 and the third ring 6 are formed as open rings and thereby make it possible for the first ring to be introduced into the groove 9. The ring assembly 2 thereby furthermore has an opening 20 between a first end 18 of the ring assembly 2 and a second end 19 of the ring assembly 2. This opening 20 is partly filled via the closure piece 3 in that installation state of the inventive sound attenuation device shown in FIG. 1.

The closure piece 3 is arranged in this installation state between the wheel web 13 and the first ring 4, where the first ring 4 overlaps with the closure piece 3 in the area of the first end 18. Thereby, the opening 20 is not filled up by the closure piece 3 in the area of the first ring 4. Instead, the first ring 4, together with the closure piece 3, forms a set-back portion in the area of the opening 20.

The closure piece 3 is formed from steel and has a cylindrical locating pin 21, which is formed in one piece with the closure piece 3. In that installation state shown in FIG. 1, the locating pin 21 is inserted with a press fit into a first hole 22 of the first ring 4, which is provided in the area of the first end 18 of the ring assembly 2.

In addition the closure piece 3 and the first ring 4 are screwed to one another via a first hexagonal head screw 24 and a second hexagonal head screw 25.

Figure 2:
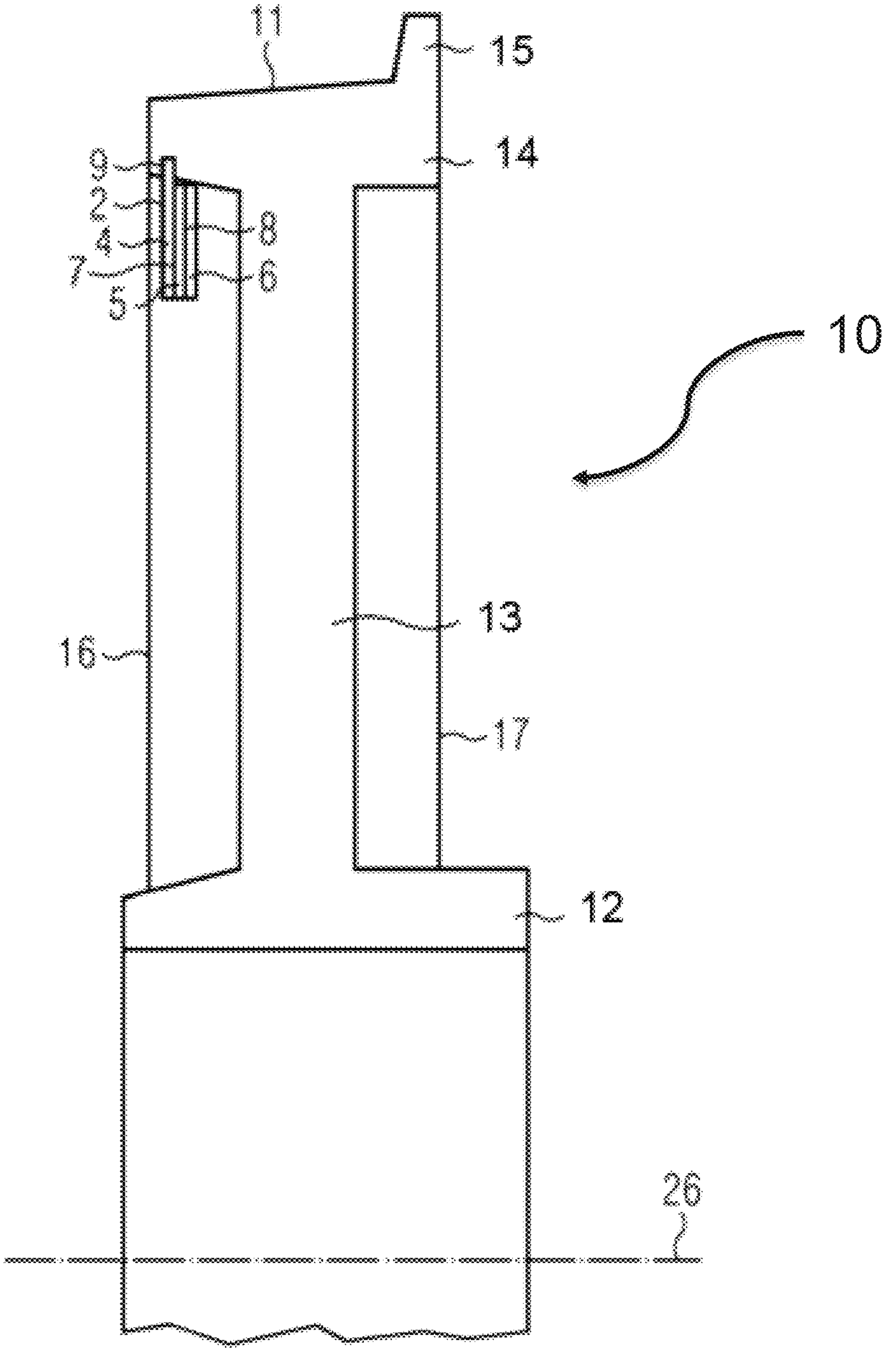
FIG. 2 shows a first part view of a side elevation of an exemplary second embodiment of an inventive sound attenuation device in a cross-sectional diagram, where a ring assembly is connected to a wheel.

Provided in the area of the second end 19 between the closure piece 3 and the ring assembly 2 is a narrow gap along edges of the closure piece 3 and the ring assembly 2, which extends in the direction of a wheel axis 26 shown by way of example in FIG. 2.

In the area of the second end 19 of the ring assembly 2, the first ring 4 has a second hole 23, by which the closure piece 3 with a suitable geometrical embodiment can also be connected to the ring assembly 2 in an orientation rotated by 180° with respect to the installation state shown in FIG. 1, where the locating pin 21 is to be inserted into the second hole 23. If in this 180°—rotated orientation, the closure piece 3 is to be screwed to the ring assembly 2, then additional holes for screws must be made in the area of the second end of the ring assembly 2.

In accordance with the invention, however, it is also conceivable to dispense with the second hole 23 and to form the first ring 4 in the area of the second end 19 of the ring assembly 2 flush with the second ring 5 and the third ring 6.

In accordance with the invention, it is further conceivable for it not to be the closure piece 3 but the first ring 4 that has the locating pin 21, for example, and for it not to be the first ring 4 but the closure piece 3 that has the first hole 22.

Over and above this, it is also conceivable, for example, for more than one locating pin 21 of the closure piece 3 or of the first ring 4 to be inserted into a corresponding number of holes of the first ring 4 or of the closure piece 3.

It is further possible to form the locating pin 21 or another locating part (e.g., a cuboid-shaped locating part) separately and to connect it to the closure piece 3 or the ring assembly 4 (e.g., to weld it, to clamp it etc.).

The closure piece 3 is formed cuboid in shape. In accordance with the invention, however, it is also conceivable for the closure piece 3 to have a ring sector-shaped or a trapezoidal bottom and top surface.

With a ring sector-shaped or a trapezoidal embodiment of the bottom and top surface, a loss of flexibility in the orientation of the closure piece 3 in the opening 20 and during its connection to the ring assembly 2 is to be taken into consideration.

Because of its arrangement in the opening 20, its shape, its dimensions adapted to the opening 20 and also its mass, the closure piece 3 contributes to the extent of 12 m·g to an overall imbalance of the wheel and of the sound attenuation device to the extent of 27 m·g. This overall imbalance is thus less than the overall imbalance limit value of the wheel of 30 m·g.

For installation of the inventive sound attenuation device, in a first installation step the first ring 4 is inserted under pre-tension into the groove 9 of the wheel body 10, in a second installation step the closure piece 3 is inserted into the opening 20 and into the free space between the wheel body 10 and the ring assembly 2, and in a third installation step the closure piece 3 is connected via insertion of the locating pin 21 into the first hole 22 and viascrewing in a form fit and or force fit manner to the ring assembly 2.

In accordance with the invention, it is also conceivable, before insertion of the first ring 4 into the groove 9, to introduce a commercially available installation paste into the groove 9.

It is furthermore conceivable to glue the closure piece 3 to the ring assembly 2.

Shown in FIG. 2 is a first partial view of a side elevation of an exemplary second embodiment of an inventive sound attenuation device in cross section, in which a ring assembly 2 is connected to a wheel of a bogie of a rail vehicle.

The ring assembly 2 has an open first ring 4, an open second ring 5 and an open third ring 6, which are connected to one another via a viscoelastic first layer 7 as well as a viscoelastic second layer 8 via vulcanization.

The first layer 7 in this case is arranged between the first ring 4 and the second ring 5 and the second layer 8 between the second ring 5 and the third ring 6. In accordance with the invention however it is also conceivable, instead of the first layer 7 and the second layer 8, for an open first elastic ring to be provided between the first ring 4 and the second ring 5 as well as an open second elastic ring between the second ring 5 and the third ring 6 and to connect (e.g., to glue) the first elastic ring and the second elastic ring to the ring assembly 2.

The first layer 7 and the second layer 8 are formed in an elastomer material and each have a thickness of around 2 mm.

The first ring 4, the second ring 5 and the third ring 6 each have a thickness of around 5 mm and are formed in steel. In accordance with the invention, however, the use of other materials for the first ring 4, the second ring 5 and the third ring 6 is also possible, such as for example stainless steel, copper etc.

The first ring 4 has a greater outer diameter than the second ring 5 and the third ring 6. A corresponding overlap of the first ring 4 is inserted under pre-tensioning of the first ring 4 into a recess of a wheel body 10 of the wheel formed as a groove 9 and clamped in the groove 9 to the wheel body 10.

The wheel comprises the wheel body 10 and also a running surface 11, which is in contact with a rail of a track (not shown in FIG. 2). The wheel body 10 has a wheel hub 12, a wheel web 13 and a wheel rim 14 with a wheel flange 15.

The groove 9 is formed extending around in the wheel rim 14 on a side facing (oriented) away from the running surface 11, whereby the ring assembly 2 extends in the direction of the wheel hub 12 or in the direction of a center of the wheel (wheel axle 26).

The first ring 4 is arranged facing (oriented) towards a wheel outer side 16, the third ring 6 is arranged facing towards a wheel inner side 17 and the wheel web 13. The second ring 5 is arranged between the first ring 4 and the third ring 6.

Figure 3:
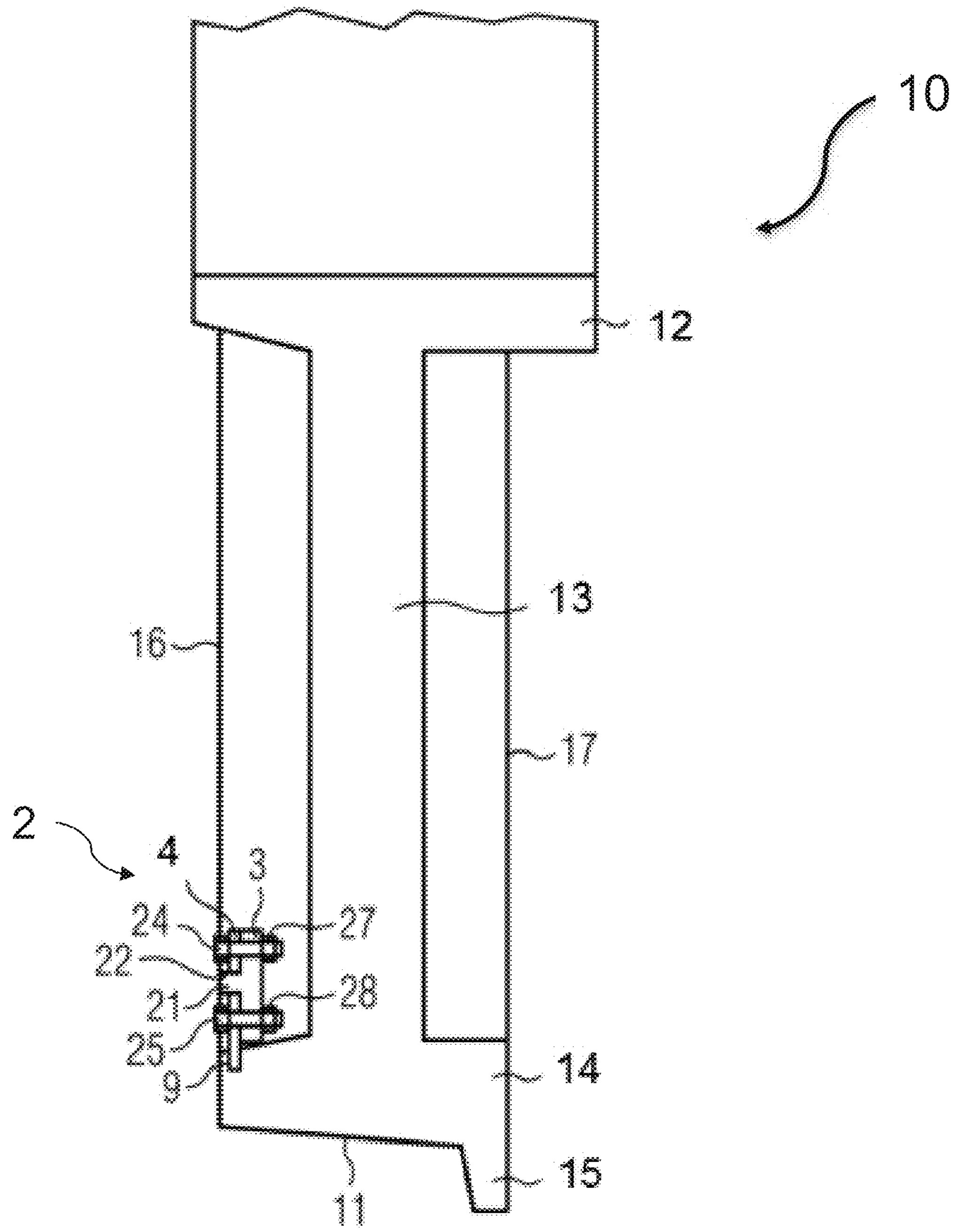
FIG. 3 shows a second partial view of the side elevation of the exemplary second embodiment of an inventive sound attenuation device in a cross-sectional diagram, where a closure piece is visible.

Sufficient free space is provided between the third ring 6 and the wheel web 13 for connecting a closure piece 3 visible in FIG. 3 to the ring assembly 2.

The sound attenuation device is provided on the outer side 16 of the wheel. In accordance with the invention, however, it is also conceivable to connect the sound attenuation device to the wheel on the inner side 17 of the wheel.

Furthermore, it is conceivable to arrange a first sound attenuation device on the outer side 16 of the wheel and a second sound attenuation device on the inner side 17 of the wheel, where the second sound attenuation device can be clamped to the wheel body 10 in a second groove on a side lying opposite a first groove (the groove 9) with regard to the wheel web 13.

Shown in cross section in FIG. 3 is a second partial view of a side elevation of that exemplary second embodiment of an inventive sound attenuation device, which is also shown in FIG. 2.

The sound attenuation device has a ring assembly 2 and a cuboid-shaped closure piece 3. Only the first ring 4 of the ring assembly 4, which, as in FIG. 2, has an open first ring 4, an open second ring 5 and an open third ring as well as a viscoelastic first layer and a viscoelastic second layer 8 is visible in FIG. 3.

The sound attenuation device is connected to a wheel body 10 of a wheel of a bogie or a rail vehicle. The wheel comprises the wheel body 10 and also a running surface 11. The wheel body 10 has a wheel hub 12, a wheel web 13 and a wheel rim 14 with a flange 15.

The first ring, as is also described in conjunction with FIG. 1 and FIG. 2, is inserted into a groove 9, which is provided in the wheel rim 14 lying opposite the running surface 11.

The ring assembly 2 has an opening 20, which is visible in conjunction with an exemplary first embodiment of an inventive sound attenuation device in FIG. 1. This opening 20 is partly filled via the closure piece 3. The closure piece 3 is arranged in that installation state shown in FIG. 3 between the wheel web 13 and the first ring 4, where the first ring 4 overlaps the closure piece 3 in the area of a first end 18 of the ring assembly 2 visible in FIG. 1 in conjunction with the exemplary first embodiment of an inventive sound attenuation device.

The closure piece 3 is formed from steel, where other materials are conceivable however, such as stainless steel, and/or copper.

The closure piece 3 has a locating pin 21. An overall thickness of the closure piece 3 with the locating pin 21 amounts to around 20 mm.

In order to be able to insert the closure piece 3 into an area between the wheel web 13 and the first ring 4, a distance between the wheel web 13 and the first ring 4 amounts to around 30 mm.

In the installation state shown in FIG. 3, the locating pin 21 is inserted with a press fit into a first hole 22 of the first ring 4, which is provided in the area of the first end 18 of the ring assembly 2.

In addition, the closure piece 3 and the first ring 4 are screwed to one another in the area of the first end 18 of the ring assembly 2 by means of a first hexagonal head screw 24 and a first nut 27 as well as a second hexagonal head screw 25 and a second nut 28. The closure piece 3 is thus connected by a form fit and a force fit to the ring assembly 2.

The first hexagonal head screw 24 and the second hexagonal head screw 25 are shown as screws that pass all the way through. In accordance with the invention, however, an arrangement of blind-hole screws between the ring assembly 2 and the closure piece 3 is also conceivable, where the first nut 27 and the second nut 28 can be omitted.

As described in conjunction with FIG. 1, the closure piece 3 is configured and arranged such that an overall imbalance of the wheel with the inventive sound attenuation device is less than an overall imbalance limit value of the wheel.

Figure 4:
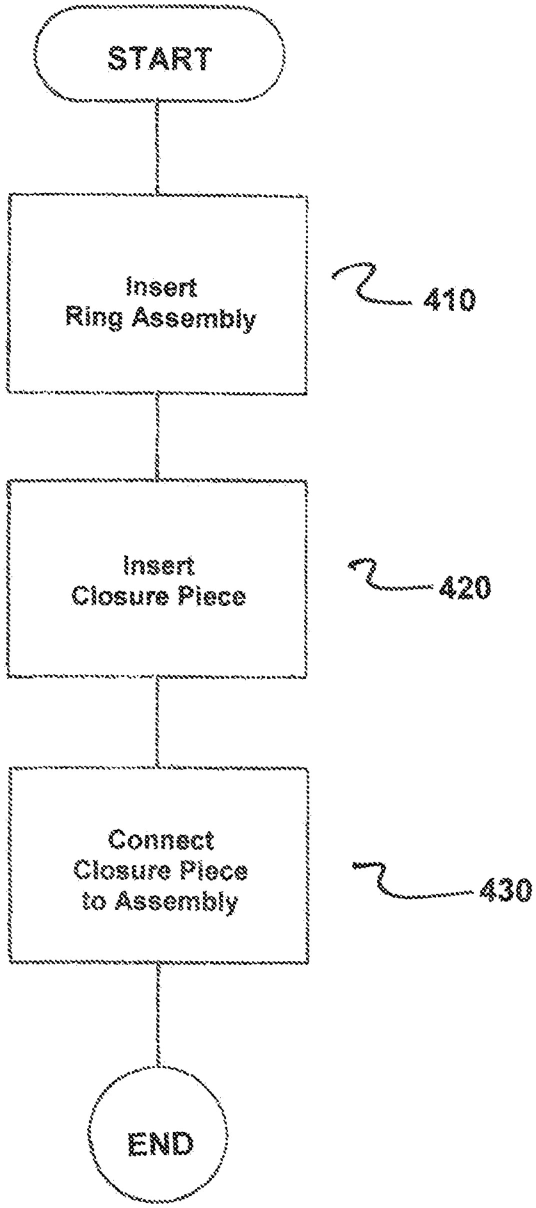
FIG. 4 is a flowchart of the method in accordance with the invention.

FIG. 4 is a flowchart of the method for installation of a sound attenuation device for vehicle wheels comprising a ring assembly 2 with at least one open first ring 4 and an open second ring 5, a viscolelastic first layer 7 or an open elastic ring arranged between the at least one open first ring 4 and the open second ring 5, at least the first ring 4 being clampable to a wheel body 10 in a recess of a wheel body 10 of a wheel of the vehicle, and comprising a closure piece 3 connected to the ring assembly 2, where the closure piece 3 is arranged in an opening 20 between a first end 18 of the ring assembly 2 and a second end 19 of the ring assembly 2, and where a first sound attenuation device is provided on a wheel outer side 16 and a second sound attenuation device is provided on a wheel inner side 17.

The method comprises inserting the ring assembly 2 under pre tension into the recess of the wheel body 10, as indicated in step 410. Next, the closure piece 3 is inserted into the opening 20, as indicated in step 420. Next, the closure piece 3 is connected to the ring assembly 2, as indicated in step 430.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sound attenuation device for vehicle wheels, comprising:

a ring assembly with at least one open first ring and an open second ring;

a viscolelastic first layer or an open elastic ring arranged between the at least one open first ring and the open second ring, at least the first ring being clampable to a wheel body in a recess of the wheel body of a wheel of the vehicle; and a closure piece connected to the ring assembly, the closure piece including a locating pin which is formed in one piece with the closure piece and which extends parallel to a wheel axis, and the closure piece being arranged in an opening between a first end of the ring assembly and a second end of the ring assembly;

wherein the closure piece is one of (i) connected to the ring assembly in a form fitting manner, (ii) connected to the ring assembly in a force fitting manner, and (iii) glued to the ring assembly; and wherein the ring assembly, at least in an area of the first end, includes at least one first hole, into which a locating pin of the closure piece or a locating part connected to the closure piece is inserted.

2. The sound attenuation device as claimed in claim 1, wherein the closure piece is arrangeable between a wheel web and the at least first ring.

3. The sound attenuation device as claimed in claim 1, wherein the ring assembly, in an area of the second end, includes at least one second hole.

4. The sound attenuation device as claimed in claim 1, wherein the ring assembly, at least in an area of the first end, includes at least one locating pin or at least one locating part is connected to the ring assembly, which is inserted into a hole of the closure piece.

5. The sound attenuation device as claimed in claim 1, wherein the ring assembly is screwed to the closure piece.

6. The sound attenuation device as claimed in claim 1, wherein the ring assembly is formed and arranged to overlap the closure piece.

7. The sound attenuation device as claimed in claim 1, wherein the at least first ring has a greater outer diameter than the second ring.

8. The sound attenuation device as claimed in claim 1, wherein the at least first ring is clampable to the wheel body in a groove of the wheel body, which is provided on a side of a wheel rim of the wheel which is oriented away from a running surface of the wheel.

9. The sound attenuation device as claimed in claim 1, wherein the closure piece is arranged such that an overall imbalance of the wheel with the sound attenuation device is equal to or less than an overall imbalance limit value of the wheel.

10. A wheel for rail vehicles including the at least one sound attenuation device as claimed in claim 1.

11. The wheel as claimed in claim 10, wherein a first sound attenuation device is provided on a wheel outer side and a second sound attenuation device is provided on a wheel inner side.

12. A bogie for rail vehicles with the wheel as claimed in claim 10, wherein at least one shoe brake is provided.

13. A bogie for rail vehicles with the wheel as claimed in claim 11, wherein at least one shoe brake is provided.

14. The sound attenuation device as claimed in claim 1, wherein the vehicle wheels comprise wheels of rail vehicles.

15. A method for installation of a sound attenuation device for vehicle wheels comprising a ring assembly with at least one open first ring and an open second ring, a viscolelastic first layer or an open elastic ring arranged between the at least one open first ring and the open second ring, at least the first ring being clampable to a wheel body in a recess of the wheel body of a wheel of the vehicle, and comprising a closure piece connected to the ring assembly, the closure piece including a locating pin which is formed in one piece with the closure piece and which extends parallel to a wheel axis, and the closure piece being arranged in an opening between a first end of the ring assembly and a second end of the ring assembly, and a first sound attenuation device being provided on a wheel outer side and a second sound attenuation device being provided on a wheel inner side, the method comprising:

inserting the ring assembly under pre-tension into the recess of the wheel body;

inserting the closure piece into the opening; and connecting the closure piece to the ring assembly;

wherein the closure piece is one of (i) connected to the ring assembly in a form fitting manner, (ii) connected to the ring assembly in a force fitting manner, and (iii) glued to the ring assembly; and wherein the ring assembly, at least in an area of the first end, includes at least one first hole, into which a locating pin of the closure piece or a locating part connected to the closure piece is inserted.

* * * * *